US006954464B2

(12) United States Patent
Jürgensen et al.

(10) Patent No.: US 6,954,464 B2
(45) Date of Patent: Oct. 11, 2005

(54) PRIORITISATION METHOD FOR USERS RANDOMLY ACCESSING A COMMON COMMUNICATION CHANNEL

(75) Inventors: Jens-Uwe Jürgensen, Fellbach (DE); Stefan Kornprobst, Glienicke (DE)

(73) Assignee: Sony International (Europe) GmbH, Berlin (DE)

( * ) Notice: Subject to any disclaimer, the term of this patent is extended or adjusted under 35 U.S.C. 154(b) by 934 days.

(21) Appl. No.: 09/824,967

(22) Filed: Apr. 3, 2001

(65) Prior Publication Data

US 2001/0036113 A1 Nov. 1, 2001

(30) Foreign Application Priority Data

Apr. 4, 2000 (EP) ........................................... 00107330

(51) Int. Cl.[7] .................................................. H04J 3/16

(52) U.S. Cl. ...................................... 370/437; 370/329

(58) Field of Search ................................ 370/310–350, 370/431–462, 470–474, 478–480; 455/422, 67.3, 561

(56) References Cited

U.S. PATENT DOCUMENTS 6,259,686 B1 * 7/2001 Blanc et al. ................ 370/337
6,333,789 B1 * 12/2001 Shima ....................... 358/1.15
6,597,682 B1 * 7/2003 Kari ........................... 370/348
6,788,943 B1 * 9/2004 Hamalainen et al. ....... 455/450

* cited by examiner

*Primary Examiner*—David Vincent
(74) *Attorney, Agent, or Firm*—Frommer Lawrence & Haug LLP; William S. Frommer

(57) ABSTRACT

The present invention relates to a communication device and a communication method for transmitting and receiving data in a communication system, in which a random access channel with a plurality of access resources is provided. The communication device (1) comprises selecting means (5) for randomly selecting an access resource from said plurality of access resources on the basis of an access probability distribution being allocated to said communication device (1), said access probability distribution defining the probability of a random access to the random access resources, whereby at least two access resources have a different access probability, and transmitting means (3) for transmitting a random access burst in the randomly selected access resource.

Figure 1:
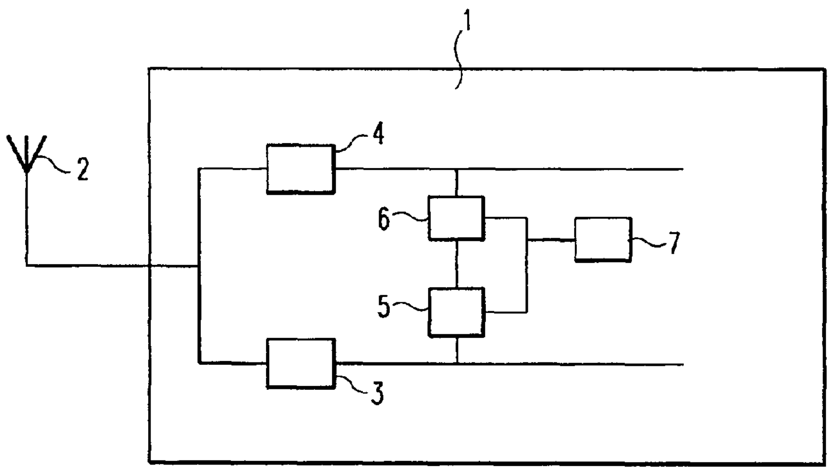

The use of an access probability distribution allows a very flexible and effective way of accessing the random access channel of the communication system, which may be a wired or a wireless communication system.

19 Claims, 2 Drawing Sheets

PRIORITISATION METHOD FOR USERS RANDOMLY ACCESSING A COMMON COMMUNICATION CHANNEL

The present invention relates to a communication device and a communication method for transmitting and receiving data in a communication system, in which a random access channel with a plurality of access resources is provided. The present invention particularly relates to the way how the access resources of the random access channel are randomly accessed.

A random access channel is a common communication channel used to build up a connection from one communication device to another communication device of a communication system. The communication system can hereby be a wireless communication system or a wired communication system or a mixture of both.

The access resources of a random access channel are randomly accessed by a communication device which for example wants to build up a connection or to send a short message. Thereby, the access is contention-based which means that several communication devices trying to build up a connection might try to access the same access resource simultaneously. In wireless telecommunication systems, as e.g. the UMTS system or a UMTS-like system, where a mobile terminal wanting to build up a connection and/or transmit data requests an access resource of a random access channel by randomly selecting an access resource and transmitting a preamble part of a random access burst to the base station. Hereby, the preamble part of the random access burst represents the request for the randomly selected access resource. A base station receiving the preamble part grants the requested access source if it is available and sends a corresponding acknowledgement signal back to the mobile terminal. In a certain situation, e.g. if no appropriate access resource is available on the network side, the base station transmits a negative acknowledgement signal back to the mobile terminal indicating that the requested access resource is not available. In case that the respective base station grants the request, it transmits a positive acknowledgement signal. The mobile terminal receiving the positive acknowledgement signal then transmits the message part of the random access burst, which contains the data upon which the building up of a connection and/or the transmission of data between the mobile terminal and the base station is based. In case that several mobile terminals access the same access resource simultaneously, the base station is not able to receive the access requests and thus does not transmit any acknowledgement signal. The mobile terminals then have to transmit access requests again.

Depending on the respective communication system, the access resources may be time slots as in a TDMA (Time Divisional Multiple Access) system, frequencies as in a FDMA (Frequency Division Multiple Access) system, codes as in a CDMA (Code Division Multiple Access) system or mixtures thereof, as in the UMTS system, in which an access resource in the random access channel is defined by a time slot and a signature code.

The general problem is that the mechanism of gaining access to the access resources of the random access channel is contention-based. In order to allow a more efficient access to the random access channel, different proposals have been made. For example, EP 98 118 819.6, which is a document according to Article 54(3) EPC proposes to divide the access resources of the random access channel into several groups, whereby each group corresponds to a respective priority class. Each priority class thereby represents the transmission priority of the random access data to be transmitted. Thus, the access requests for different kinds of data are transmitted with different priorities, so that certain kinds of data have a higher probability to gain access to an access resource of the random access channel than other kinds of data. This proposed system, however, is very inflexible, since a respective number of access resources is fixedly allocated to a specific kind of data. Further, the only criteria for the allocation of a specific access priority and thus the access probability is the data kind. WO97/19525 proposes a more flexible system, in which the access of a random access channel in a communication system relies on the use of varying access probabilities for subscribers or messages of varying priority. Thereby, mobile terminals are divided into different priority groups, whereby each group has a different access probability for accessing an access resource of the random access channel. Two basic schemes of the distribution and allocation of access probabilities to the mobile terminals are proposed, namely a proportional priority distribution and a temporal priority distribution. In the proportional priority distribution, each group of mobile terminals attempts access to all available access resources of the random access channel, but with different access probabilities. Each group has a different access probability, but every access resource can be accessed by every user. In the temporal priority distribution, the highest priority group, i.e. the group having the highest access probability to the access resources, attempts access to all available access resources, whereby the lower priority user groups, i.e. the user groups having a lower access probability, only attempt access to a part of the available access resources. The disadvantage here is that access attempts of the highest priority group have to content with the access attempts of all other priority groups. Further, the proposed scheme treats every access resource equally. If the system is e.g. a TDMA system, then the access resources are time slots. For every time slot and for a given user or data type, there is a probability (typically in the form of a so-called persistence value) for a random access and every time slot is used with this same probability. Based on the probability, it is decided for each time slot on the basis of an equal treatment of all the time slots, if the time slot can be used to send an access burst or not. If not, then the next time slot is tried.

The object of the present invention is therefore to provide a communication device and a communication method for transmitting and receiving data in a communication system, which provide an improved, more effective and more flexible way of accessing access resources of a random access channel.

The above object is achieved by a communication device for transmitting and receiving data in a communication system according to claim 1, whereby a random access channel with a plurality of access resources is provided. The communication device comprises selecting means for randomly selecting an access resource from said plurality of access resources on the basis of an access probability distribution being allocated to said communication device, said access probability distribution defining the probability of a random access to said access resources, whereby at least two resources have a different access probability, and a transmitting means for transmitting a random access burst in the randomly selected access resource.

The above object is further achieved by a communication method for transmitting and receiving data in a communication system according to claim 12.

Advantageous features are defined in the respective subclaims.

The present invention provides an improved, more effective and more flexible way of accessing access resources of a random access channel in a communication system. The communication may therefore be a wireless or a wired communication system or a combination thereof. Particularly, the present invention advantageously allows the prioritisation of users or communication devices by allocating a probability distribution to each communication device or user, on which the random access to the access resources of the random access channel is based.

Advantageously, the plurality of access resources is divided into at least two access resource groups, whereby the communication device is allocated to one of the access resource groups and the selecting means randomly selects an access resource only from said allocated access resource group on the basis of the access probability distribution. Thereby, within one access resource group all allocated communication devices may have the same probability distribution for accessing the access resources or may have different access probability distributions. Further, the communication devices of the communication system could form groups, whereby each group has an allocated access probability distribution which is used by all the communication devices of the group. Other groups of communication devices then have different access probability distributions.

Further advantageously, the communication device of the present invention comprises a memory means in which the access probability distribution is stored. Said memory means may be a fixed part of the communication device or may be part of a device which is connectable to the communication device. In case that the communication device is a mobile terminal of a wireless telecommunication system, this device might be a subscriber identity module or the like, or a memory stick.

Further advantageously, the access probability distribution is changed upon the occurrence of a specific event. For example, after the reception of a predetermined number of negative acknowledgement signals after the transmission of access requests to the random access channel, the access probability distribution could be changed so that the communication device obtains a higher access probability. If e.g. a specific data type has an access probability distribution allocated as a standard setting, this access probability distribution can thus be changed independently from the data types. The specific event may be the reception of a corresponding signalling information from another communication device. In this case, the probability distribution can be changed if system parameters change and necessitate a change in the access probability distributions. This change may be signalled from another communication device. Alternatively, the specific event can be a timepoint. In case that users using the communication devices show distinct use habits in using the communication devices according to the present invention, the access probability distributions can be changed depending on this varying use habits.

Advantageously, the communication device according to the present invention is a mobile terminal of a wireless UMTS system, whereby the access resource of the random access channel are defined by time slots and signature codes.

Figure 2:
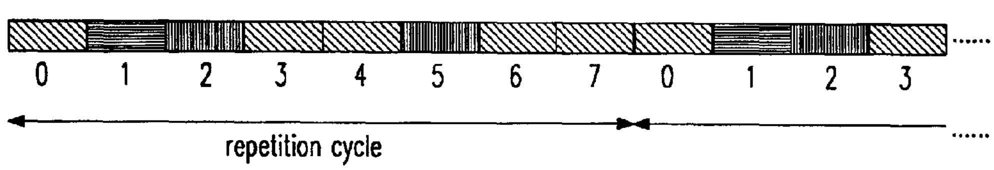
Figure 3:
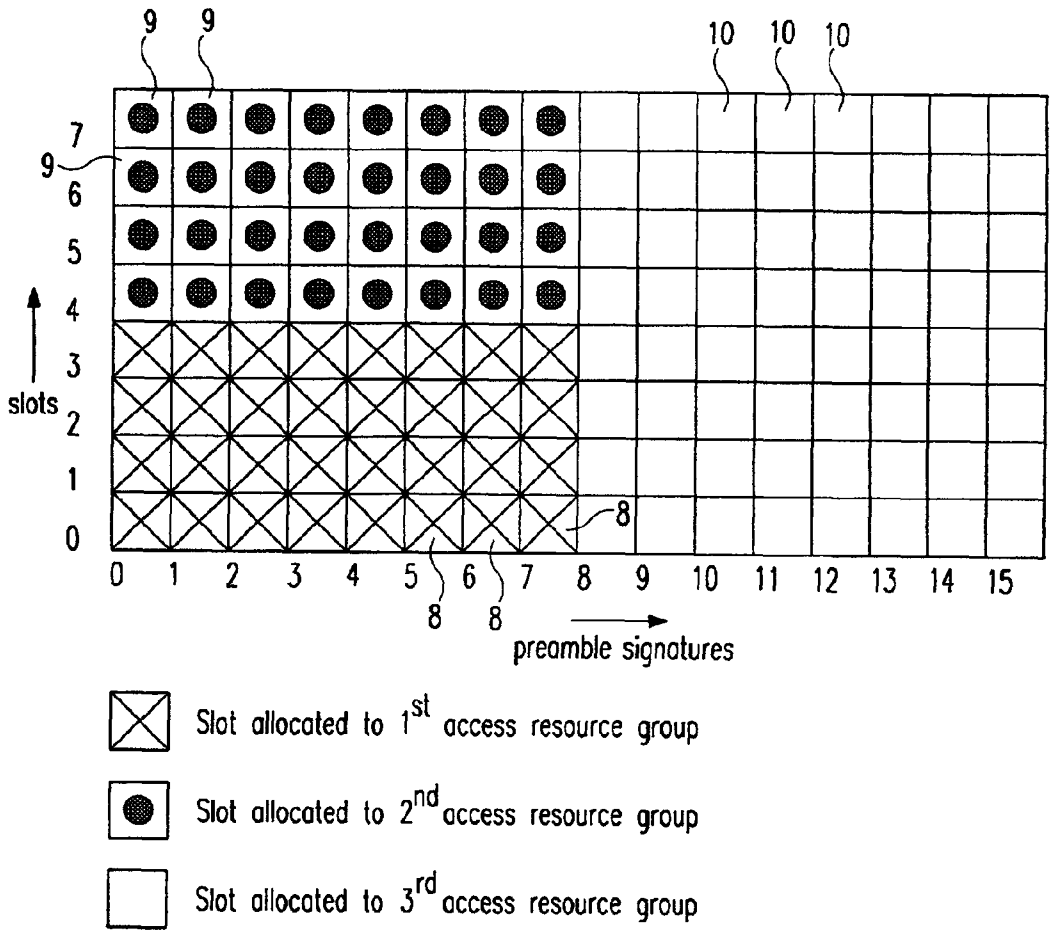

The present invention is explained in greater detail in the following description relating to the enclosed drawings, in which FIG. 1 shows a schematic diagram of a communication device according to the present invention, FIG. 2 shows a first example of dividing access resources into groups, and FIG. 3 shows a second example of dividing access resources into groups.

FIG. 1 shows a schematic block diagram of a communication device 1 according to the present invention. The communication device 1 shown in FIG. 1 is a mobile connected to a transmitting means 3 and the receiving means 4 for transmitting and receiving communication data to and from a base station or another mobile terminal of the wireless telecommunication system. The wireless telecommunication system can e.g. be the GSM system or the UMTS system. The mobile terminal 1 thus comprises all necessary elements for communicating and processing data, such as coders, decoders, modulators, demodulators and the like, although these elements are not shown in FIG. 1 and not explained in the present application. It is to be noted, that the mobile terminal 1 shown in FIG. 1 is only used as an example for the communication device according to the present invention, which may also be an end terminal of a wired communication system, such as a telephone apparatus, a personal computer or the like.

The communication system, in which the communication device 1 according to the present invention operates and in which the communication method according to the present invention is performed, comprises a random access channel (RACH) providing a plurality of access resources. These resources are used by the communication device 1 to build up a connection. In case of a wireless telecommunications system, a mobile terminal uses the access resources of the random access channel to transmit an access request to a corresponding base station. In the UMTS system, the access request is transmitted in the preamble part of the random access burst as explained above. The access resources are thereby accessed randomly, which leads to a contention-based access mechanism. Several access requests coming from different mobile terminals may compete or content for the same access resource at the base station. In this case the base station does not receive any access request transmitted from the mobile terminals, and the mobile terminals do not receive any acknowledgement signal and have to send the access requests after a certain time period. The same scheme applies to communication devices which are connected through a wired network.

According to the present invention, the communication device has an allocated access probability distribution, said access probability distribution defining the probability of a random access to the access resources of the random access channel. At least two of the random access resources have a different access probability. The communication device 1 comprises a selecting means 5 for randomly selecting an access resource on the basis of the allocated access probability distribution, which is stored in a memory means 7. A random access burst is then transmitted by the transmitting means 3 via the antenna 2 to another communication device, as e.g. a base station.

As an example, it is assumed that only three random access resources are available in the random access channel, whereby these access resources are denoted as $r_1$, $r_2$ and $r_3$. Further, four communication devices or users are present in the communication system, which randomly access these access resources. The four different communication devices or users are denoted as $u_1$, $u_2$, $u_3$ and $u_4$. Each of the four users has allocated a different access probability distribution defining the probability of a random access to each of the available access resources. An example for these four different access probability distributions could be the following, whereby $p(u_i, r_j)$ defines the probability that user $u_i$ attempts to access the access resource $r_j$ when trying to access the random access channel:

| | | |
|---|---|---|
| $p(u_1, r_1) = 80\%$ | $p(u_1, r_2) = 10\%$ | $p(u_1, r_3) = 10\%$ |
| $p(u_2, r_1) = 10\%$ | $p(u_2, r_2) = 80\%$ | $p(u_2, r_3) = 10\%$ |
| $p(u_3, r_1) = 10\%$ | $p(u_3, r_2) = 20\%$ | $p(u_3, r_3) = 70\%$ |
| $p(u_4, r_1) = 10\%$ | $p(u_4, r_2) = 20\%$ | $p(u_4, r_3) = 70\%$ |

In the above table, it can be seen that e.g. user $u_1$ will only very seldomly have collisions when accessing the random access channel, because most of the time he will attempt to access the access resource $r_1$, which is accessed by other users very seldomly. User $u_2$ will have more collisions then user $u_1$, because most of the time he will access resource $r_2$, which is sometimes also accessed by other users. User $U_3$ will have collisions most of the time when accessing the channel, because most of the time he will access resource $r_3$, which is also accessed quite often by other users. The same is true for user $u_4$.

Instead of having users or communication devices with a respective different access probability distribution, groups of users or communication devices could be defined, whereby each group, i.e. each user or each communication device of each group has the same access probability distribution. Thus, different prioritisation classes for users or communication devices could be built. In each group, the same access probability distribution is used to access the random access channel. The building of groups can in certain scenarios reduce the overhead associated with the allocation of access probability distributions to users or communication devices, particularly if the access probability distribution is signalled or transmitted, in which case the signalling or transmitting of the respective access probability distribution information can be done commonly for a group and not for every single communication device or user. In the example given above, e.g. user $u_1$ may belong to a first group of users, user $u_2$ may belong to a second group of users, user $u_3$ may belong to a third group of users and user $u_4$ may belong to a fourth group of users, whereby the third and the fourth group of users have the same access probability distribution, which is different from the access probability distribution of the first and the second group.

Alternatively or additionally to the forming of user or communication device groups, the access resources of the random access channel of the communication system can be divided in two or more access resource groups. In this case, a communication device or a user is allocated to one of the access resource groups and an access resource is randomly selected only from the respectively allocated access resource group on the basis of the access probability distribution. In the example given above, access resources $r_1$, $r_2$ and $r_3$ could e.g. form one group to which the users $u_1$, $u_2$, $u_3$ and $u_4$ are allocated. However, further access resource groups could be formed by further access resources. This scheme of grouping the access resources into different groups is explained in the following in relation to the examples shown in FIGS. 2 and 3.

Generally, the access resources can be defined by a frequency, a time slot or a code or any combination thereof depending on the multiple access scheme used in the corresponding wireless or wired communication system. FIG. 2 shows an example, in which the access resources or the random access channel are time slots. One repetition cycle or the random access time window comprises e.g. eight time slots 0, 1, . . . , 7. In the example shown in FIG. 2, the available eight access resources or time slots are divided into three access resource groups. The first group comprises the five time slots 0, 3, 4, 6, 7 indicated by the diagonal pattern, the second group comprises the two time slots 2, 5 indicated by the vertical pattern and the third group comprises one time slot 1 indicated by the horizontal pattern. A group of communication devices or users allocated to the first group of access resources could thus use the same common access probability distribution to access the access resources of the first group, or the communication devices or users allocated to the first group could use respectively different access probability distributions. The same is true for the second group of access resources. Since the third group only contains a single access resource, a communication device allocated to the third group cannot use an access probability distribution since only a single time slot can be randomly selected. However, the probability on which the access attempts to this single time slot are based, does not have to be 100%, but can have a lower value depending on the intended application.

FIG. 3 shows a second example of access resources being divided into access resource groups according to the present invention. In the shown example, an access resource is defined by a time slot (or time offset) and a preamble signature (or signature code). In a UMTS system, e.g., a random access channel comprises up to 15 time slots and 16 preamble signatures within two radio frames or two random access time windows, so that up to 240 access resources are available in total. FIG. 3 shows a corresponding example with 8 time slots 0, 1, . . . , 7 and 16 preamble signatures 0, 1, . . . , 15. The access resources are divided into three access resource groups. The access resources indicated by the cross belong to the first access resource group and are defined by the time slots 0, 1, 2, 3 and preamble signatures 0, 1, 2, 3, 4, 5, 6, 7. The access resources indicated by the point belong to the second access resource group and are defined by the time slots 4, 5, 6, 7 and the preamble signatures 0, 1, 2, 3, 4, 5, 6, 7. The access resources indicated by a blank square belong to the third access resource group and are defined by the time slots 0, 1, 2, 3, 4, 5, 6, 7 and the preamble signatures 8, 9, 10, 11, 12, 13, 14, 15. In both examples shown in FIG. 2 and FIG. 3, the access resources are properly divided into several groups without any overlap between the groups. However, an overlap between the groups is possible, which means that one or more access resources may belong to two or more access resource groups.

As stated above, the communication device 1 according to the present invention comprises a memory means 7 in which the access probability distribution according to which the selecting means 5 randomly selects an access resource is stored. The memory means 7 can be a fixed part of the communication device 1, as e.g. an internal memory of the microcontroller or the like. Alternatively, the memory means 7 can be part of a device which is connectable to the communication device. In this case, the memory means 7 may e.g. be part of a device which has an inherent association with the user and is usually inserted into the communication device, as e.g. a unified subscriber identity module (USIM card in case of the UMTS system). Also, the memory means 7 could be part of a memory stick which can be inserted to the communication device 1. Also, a combination of the above-mentioned possibilities could be realised, as e.g. storing the access probability distribution on a subscriber identity module as well as in a fixed memory means of the communication device 1. Thereby, when a subscriber identity module is inserted and connected to the communication device 1, the access probability distribution stored in the fixed memory means could be overwritten or overruled by the access probability distribution stored in the memory means of the subscriber identity module (or the memory stick). Further, a new access probability distribution received via signalling from another communication device could be used to overwrite or overrule the current access probability distribution stored on a subscriber identity module, a memory stick and/or fixed memory means of the communication device 1. In this way, it is possible to flexibly adapt the currently allocated access probability distribution to varying system parameters or changing requirements.

Further, the access probability distribution stored in the memory means, the signalling means, the memory stick or the like can be changed upon the occurrence of a specific event. Such an event is detected in a detecting means 6 connected to the selecting means and the memory means 7. Hereby, the memory means 7 stores several possible access probability distributions and the currently allocated access probability distribution is changed upon the occurrence of a specific event, as e.g. the reception of a corresponding instruction from another communication device or the occurrence of a predefined timepoint. In the second case, e.g. specific timepoints could be defined, at which it is statistically known that users of the communication system change their behaviour in respect to the transmission of random access requests. Further, the currently allocated access probability distribution could be changed periodically. It is to be noted that any kind of specific event could be defined, upon the detection of which the access probability distribution is changed. Further, a combination of different kinds of events may be defined.

As set out above, the present invention provides a very flexible and effective way of accessing access resources of a random access channel. Particularly, the use of an access probability distribution defining different access probabilities to at least two access resources allow a very flexible definition of different prioritisation levels for users and/or communication devices or even data types to be transmitted.

What is claimed is:

1. A communication device for transmitting and receiving data in a communication system, in which a random access channel with a plurality of access resources is provided, the device comprising:

selecting means for randomly selecting an access resource from said plurality of access resources on the basis of an access probability distribution being allocated to said communication device, said access probability distribution defining the probability of a random access to said access resources;

whereby at least two access resources have a different access probability, and transmitting means for transmitting a random access burst in said randomly selected access resource.

2. The communication device according to claim 1, wherein said plurality of access resources is divided in at least two access resource groups, whereby the communication device is allocated to one of the access resource groups and said selecting means randomly selects an access resource only from said allocated access resource group on the basis of said access probability distribution.

3. The communication device according to claim 1, further comprising a memory means in which said access probability distribution is stored.

4. The communication device according to claim 3, wherein said memory means is an integral component of the communication device.

5. The communication device according to claim 3, wherein said memory means is part of a device that is connectable to the communication device.

6. The communication device according to claim 5, wherein the communication device is a mobile terminal of a wireless telecommunication system, whereby said device is a subscriber identity module.

7. The communication device according to claim 5, wherein the communication device is a mobile terminal of a wireless telecommunication system, whereby said device is a memory stick.

8. The communication device according to claim 1, wherein said access probability distribution is changed upon the occurrence of a specific event.

9. The communication device according to claim 8, wherein said specific event is the reception of a corresponding information from another communication device.

10. The communication device according to claim 8, wherein said specific event is a timepoint.

11. The communication device according to claim 1, wherein the communication device is a mobile terminal of a wireless UMTS system, whereby said access resources of said random access channel are defined by time slots and signature codes.

12. A communication method for transmitting and receiving data in a communication system, in which a random access channel with a plurality of access resources is provided, with the steps of:

randomly selecting an access resource from said plurality of access resources on the basis of an access probability distribution, said access probability distribution defining the probability of a random access to said access resources, whereby at least two access resources have a different access probability; and transmitting a random access burst in said randomly selected access resource.

13. The communication method according to claim 12, wherein said plurality of access resources is divided in at least two access resource groups, whereby one or more communication devices of the communication system are allocated to each of the access resource groups and each communication device randomly selects an access resource only from an allocated access resource group on the basis of the access probability distribution.

14. The communication method according to claim 12, wherein said access probability distribution is changed upon occurrence of a specific event.

15. The communication method according to claim 14, wherein said specific event is the reception of a corresponding information from another communication device.

16. The communication method according to claim 14, wherein said specific event is a timepoint.

17. The communication method according to claim 12, wherein said communication system is a wireless UMTS system, whereby said access resources of said random access channel are defined by time slots and signature codes.

18. A communication device for transmitting and receiving data in a communication system, in which a random access channel with a plurality of access resources is provided, the device comprising:

selecting means for randomly selecting an access resource from said plurality of access resources on the basis of an access probability distribution being allocated to said communication device, said access probability distribution defining, for each access resource of said plurality of access resources, the probability of a random access of said communication device to said access resource, so that the probabilities of a random access of said communication device to at least two access resources of said plurality of access resources are different from each other; and transmitting means for transmitting a random access burst in said randomly selected access resource.

19. A communication method for transmitting and receiving data in a communication system, in which a random access channel with a plurality of access resources is provided, with the steps of:

randomly selecting an access resource from said plurality of access resources on the basis of an access probability distribution, said access probability distribution defining, for each access resource of said plurality of access resources, the probability of a random access to said access resources, so that the probabilities of a random access of said communication device to at least two access resources of said plurality of access resources are different from each other; and transmitting a random access burst in said randomly selected access resource.

* * * * *